Figure 1:
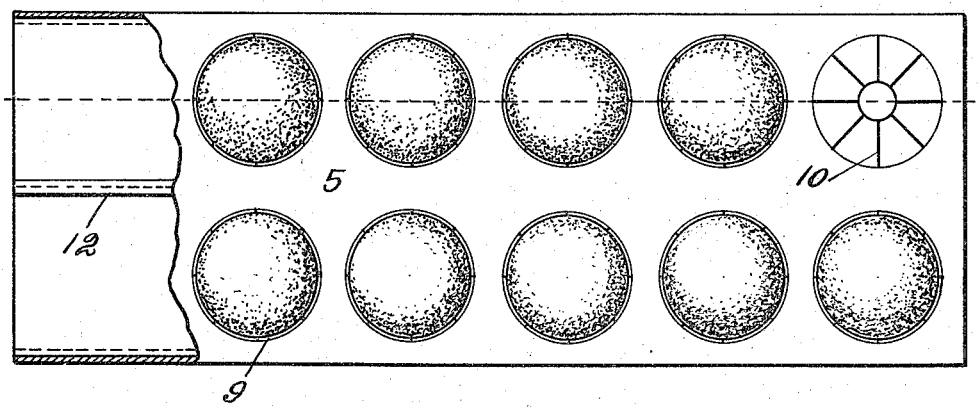

E. FORSYTH.
EGG CRATE.
APPLICATION FILED DEC. 24, 1914.

1,148,475.

Patented July 27, 1915.

Witnesses
L. Cloud Newman.
A. B. Jones.

Inventor
Ervin Forsyth
By Percy H. Moore
Attorney

UNITED STATES PATENT OFFICE.

ERVIN FORSYTH, OF CHICAGO, ILLINOIS.

EGG-CRATE.

1,148,475.  Specification of Letters Patent.  Patented July 27, 1915.

Application filed December 24, 1914. Serial No. 878,901.

*To all whom it may concern:*

Be it known that I, ERVIN FORSYTH, citizen of the United States of America, residing at Chicago, in the county of Cook and State of Illinois, have invented certain new and useful Improvements in Egg-Crates, of which the following is a specification.

My invention relates to egg crates and particularly to that class of egg crates wherein the egg is cushioned so that the same cannot be broken during transportation.

The primary object of my invention is to provide an egg crate wherein the egg supporting sections of the crate are reinforced so that crushing of the same cannot be readily effected.

Another object of my invention contemplates the provision of an egg crate which is formed of but two parts, that is, one sheet of material is adapted for the construction of one entire section thus materially decreasing the cost of manufacture and greatly facilitating its construction.

A still further object of my invention resides in the provision of an egg crate wherein the egg receiving openings are provided with integrally formed cushioning means so that the eggs may not readily be broken and as the means which prevent the egg from being broken are very easily constructed, the cost of manufacturing my device is greatly reduced.

With these and other objects in view my invention resides in such details in construction, combination and arrangement of parts as is illustrated in the drawings, described in the specification and hereinafter claimed.

Figure 2:
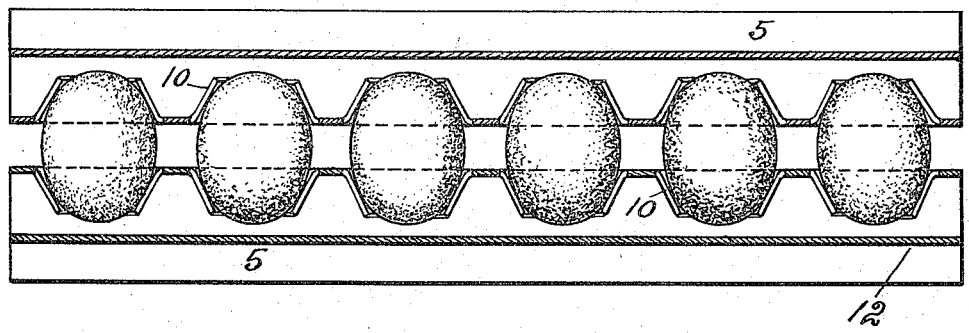
Figure 3:
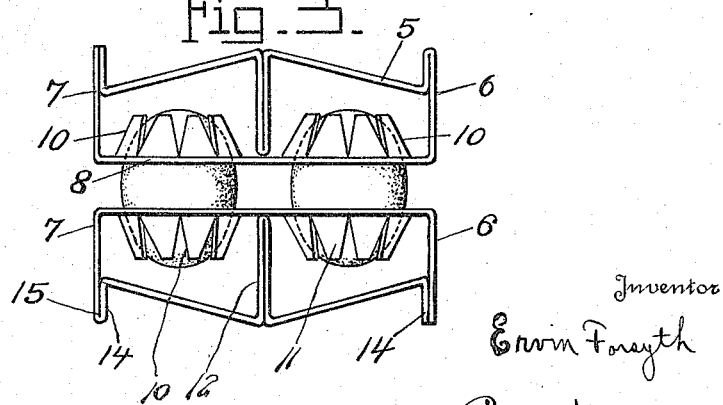

In the drawings wherein is illustrated the preferred embodiment of my invention; Figure 1 is a top plan view of my invention partially broken away. Fig. 2 is a longitudinal section through Fig. 1, and Fig. 3 is an end view.

Like characters of reference refer to like or similar parts throughout the several views.

I desire to call particular attention to the fact that each of the sections of my egg crate are composed of one piece of material which is folded and stamped to form one section as an entirety. This construction materially facilitates its manufacture and reduces the cost of the finished product.

Referring specifically to the drawings, 5 designates one of the sections of my crate and is similar in all respects to its companion section. Therefore, a description of one section will suffice. The section 5 comprises side walls or supporting walls 6 and 7 and an egg supporting face 8 having a plurality of rows of egg receiving openings formed therein. These openings which are designated generally at 9, are substantially cylindrical in shape and are provided upon their edges with depending cushioning fingers 11, in order to resiliently support the egg in position during transportation. These fingers are formed by cutting radially from the central portion of the egg receiving openings as at 10.

In order to maintain the egg supporting face in its proper place I provide a reinforcing cushioning member 12 formed with reinforcing flaps 14 at opposite sides thereof, the flap 14 being integrally connected at 15 to the side wall 7 previously referred to. The function of the flaps 14 is to reinforce the side walls 6 and 7 as clearly indicated in Fig. 1.

In operation the eggs are placed between the two sections of my egg crate and the outer casing or carton (not shown) is placed thereabout to maintain the entirety as a compact package.

Having thus described my invention, what I claim is:

A crate section comprising an egg receiving face formed with side walls, a reinforcing member bent intermediate its ends to form a two ply cushioning portion, end flaps on said reinforcing member parallel to and in engagement with said side walls one of said flaps being connected to one of said side walls and the other flap being free, and inclined portions connecting said cushioning portion with said flaps.

In testimony whereof I affix my signature in presence of two witnesses.

ERVIN FORSYTH.

Witnesses:
 H. CLAY CALHOUN,
 BESSIE NELSON.